United States Patent
Wagle et al.

(10) Patent No.: US 9,988,569 B2
(45) Date of Patent: *Jun. 5, 2018

(54) METHODS AND MATERIALS TO ENHANCE HIGH TEMPERATURE RHEOLOGY IN INVERT EMULSIONS

(71) Applicant: Halliburton Energy Services, Inc., Houston, TX (US)

(72) Inventors: Vikrant Bhavanishankar Wagle, Mumbai (IN); Shadaab Syed Maghrabi, Thane (IN); Sharath Savari, Hyderabad (IN); Sandeep D. Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/098,980

(22) Filed: Apr. 14, 2016

(65) Prior Publication Data

US 2016/0230067 A1    Aug. 11, 2016

Related U.S. Application Data

(63) Continuation of application No. 13/468,022, filed on May 9, 2012, now Pat. No. 9,346,995.

(51) Int. Cl.
| | |
|---|---|
| *C09K 8/035* | (2006.01) |
| *C09K 8/28* | (2006.01) |
| *E21B 7/00* | (2006.01) |
| *C09K 8/36* | (2006.01) |

(52) U.S. Cl.
CPC ............ *C09K 8/035* (2013.01); *C09K 8/28* (2013.01); *C09K 8/36* (2013.01); *E21B 7/00* (2013.01)

(58) Field of Classification Search
None
See application file for complete search history.

(56) References Cited

U.S. PATENT DOCUMENTS

| 3,125,517 A | * | 3/1964 | Voda ................... C09K 8/36 507/131 |
| 3,514,399 A | | 5/1970 | Robinson |
| 4,816,551 A | | 3/1989 | Oehler |
| 5,710,110 A | | 1/1998 | Cooperman et al. |
| 7,345,010 B2 | | 3/2008 | Thompson et al. |

(Continued)

FOREIGN PATENT DOCUMENTS

WO    2009138383 A1    11/2009

OTHER PUBLICATIONS

International Search Report issued in related PCT Application No. PCT/US2013/032733 dated Jul. 4, 2013, 4 pages.

(Continued)

*Primary Examiner* — John J Figueroa

(74) *Attorney, Agent, or Firm* — Tenley Krueger; Baker Botts L.L.P.

(57) ABSTRACT

An invert emulsion drilling fluid, and a method of drilling with such fluid, having improved rheology at low mud weights and high temperatures. The improved rheology is effected with addition of a rheology additive of the invention comprising fatty dimer diamines or dimer diamines and an organic acid or ester of the acid. A nonlimiting example of such a rheology additive comprises a C36 fatty dimer diamine and adipic acid or dimethyl adipate.

15 Claims, 2 Drawing Sheets

(56) References Cited

U.S. PATENT DOCUMENTS

| | | | |
|---|---|---|---|
| 7,645,723 B2 | 1/2010 | Kirsner et al. | |
| 7,906,461 B2 | 3/2011 | Dino et al. | |
| 9,346,995 B2* | 5/2016 | Wagle | C09K 8/28 |
| 9,469,803 B2* | 10/2016 | Wagle | C09K 8/36 |
| 2004/0102332 A1 | 5/2004 | Thompson | |
| 2004/0110642 A1 | 6/2004 | Thompson | |
| 2008/0029303 A1 | 2/2008 | Codazzi et al. | |
| 2011/0214864 A1* | 9/2011 | Maghrabi | E21B 43/16 166/294 |
| 2012/0097403 A1 | 4/2012 | Maghrabi et al. | |
| 2013/0303410 A1 | 11/2013 | Wagle et al. | |

OTHER PUBLICATIONS

International Preliminary Report on Patentability issued in related PCT Application No. PCT/US2013/032733 dated Nov. 20, 2014, 9 pages.
International Search Report and Written Opinion issued in related PCT Application No. PCT/US2014/045082 dated Oct. 27, 2014, 11 pages.
International Preliminary Report on Patentability issued in related PCT Application No. PCT/US2014/045082 dated Jan. 21, 2016, 9 pages.

* cited by examiner

METHODS AND MATERIALS TO ENHANCE HIGH TEMPERATURE RHEOLOGY IN INVERT EMULSIONS

CROSS-REFERENCE TO RELATED APPLICATIONS

This application claims priority to and is a continuation application of U.S. application Ser. No. 13/468,022 filed on May 9, 2012 entitled "Methods and Materials to Enhance High Temperature Rheology in Invert Emulsions," the entire disclosure of which is incorporated by reference.

BACKGROUND OF THE INVENTION

Field of the Invention

The present invention relates to compositions and methods for drilling, cementing and casing boreholes in subterranean formations, particularly hydrocarbon bearing formations. More particularly, the present invention relates to compositions for improving the rheology of invert emulsion drilling fluids, particularly at high temperatures and pressures.

Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

An important property of the drilling fluid is its rheology, and specific rheological parameters are intended for drilling and circulating the fluid through the well bore. The fluid should be sufficiently viscous to suspend barite and drilled cuttings and to carry the cuttings to the well surface. However, the fluid should not be so viscous as to interfere with the drilling operation.

Specific drilling fluid systems are selected to optimize a drilling operation in accordance with the characteristics of a particular geological formation. Oil based muds are normally used to drill swelling or sloughing shales, salt, gypsum, anhydrite and other evaporate formations, hydrogen sulfide-containing formations, and hot (greater than about 300 degrees Fahrenheit ("° F.") holes, but may be used in other holes penetrating a subterranean formation as well.

An oil-based invert emulsion-based drilling fluid may commonly comprise between about 50:50 to about 95:5 by volume oil phase to water phase. Such oil-based muds used in drilling typically comprise: a base oil comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. In the past, such additives commonly included organophilic clays and organophilic lignites. See H. C. H. Darley and George R. Gray, Composition and Properties of Drilling and Completion Fluids 66-67, 561-562 ($5^{th}$ ed. 1988). However, recent technology as described for example in U.S. Pat. Nos. 7,462,580 and 7,488,704 to Kirsner, et al., introduced "clay-free" invert emulsion-based drilling fluids, which offer significant advantages over drilling fluids containing organophilic clays.

As used herein and for the purposes of the present invention, the term "clay-free" (or "clayless") means a drilling fluid made without addition of any organophilic clays or organophilic lignites to the drilling fluid composition. During drilling, such "clay-free" drilling fluids may acquire clays and/or lignites from the formation or from mixing with recycled fluids containing clays and/or lignites. However, such contamination of "clay-free" drilling fluids is preferably avoided and organophilic clays and organophilic lignites should not be deliberately added to "clay-free" drilling fluids during drilling.

Invert emulsion-based muds or drilling fluids (also called invert drilling muds or invert muds or fluids) comprise a key segment of the drilling fluids industry, and "clay-free" invert emulsion-based muds, particularly those capable of "fragile gel" behavior as described in U.S. Pat. Nos. 7,462,580 and 7,488,704 to Kirsner, et al., are becoming increasingly popular.

Clay-free invert emulsion drilling fluids, like INNO-VERT® drilling fluid available from Halliburton Energy Services, Inc., in Duncan, Okla. and Houston, Tex., for example, have been shown to yield high performance in drilling, with "fragile gel" strengths and rheology leading to lower equivalent circulating density (ECDs) and improved rate of penetration ROP.

A limiting factor in drilling a particular portion of a well is the mud weight (density of the drilling fluid) that can be used. If too high a mud weight is used, fractures are created in the formation with resulting loss of drilling fluid and other operating problems. If too low a mud weight is used, formation fluids can encroach into the well, borehole collapse may occur due to insufficient hydrostatic support, and in extreme cases safety can be compromised due to the possibility of a well blowout. Many times, wells are drilled through weak or lost-circulation-prone zones prior to reaching a potential producing zone, requiring use of a low mud weight and installation of sequential casing strings to protect weaker zones above the potential producing zone. A particularly critical drilling scenario is one that combines deepwater and shallow overburden, as is typical of ultra deepwater fields in Brazil. This scenario is characterized by high pore fluid pressure, low effective stresses, low fracturing gradients and narrow mud weight windows.

Commercially available clay-free invert emulsion drilling fluids may have less than preferred rheology at low mud weights, that is, mud weights ranging from about 9 ppg to about 12 ppg, with temperatures up to about 375° F. or higher. Addition of inert solids may improve the rheology, but result in a decreased rate of penetration during drilling and loss of or decline in other benefits seen with a clay free system. Such inert solids include for example, fine sized calcium carbonate, and the term as used herein is not meant to be understood to include or refer to drill cuttings. Low mud weight or reduced density clay-free oil based invert emulsion drilling fluids also may show a decline in the desired "fragile gel" strength characteristic of clay-free invert emulsion drilling fluids. "Fragile gel" strength generally refers to the ability of the drilling fluid to both suspend drill cuttings at rest and show a lack of a pressure spike upon resumption of drilling. Solids added to an invert emulsion drilling fluid may be difficult to remove later in the drilling process and can ultimately lead to poor control over the rheology of the drilling fluid system and decreased rate of penetration (ROP).

Also, commonly used mineral oils often used in formulating invert emulsion fluids include n-paraffins, mixtures of n-paraffins, iso-paraffins, and cyclic and branched chain alkanes. These base oils have low viscosities and invert emulsion fluids prepared with them typically need additives to impart adequate rheology.

Increasingly invert emulsion-based drilling fluids are being subjected to ever greater performance and cost demands as well as environmental restrictions. Consequently, there is a continuing need and industry-wide interest in new drilling fluids that provide improved performance while still affording environmental and economical acceptance.

SUMMARY OF THE INVENTION

The present invention provides an additive for oil-based invert emulsion drilling fluids to improve the rheology of the fluids without the addition of inert solids, across a broad range of temperatures and pressures. The invention is particularly advantageous at high temperatures and pressures, such as temperatures ranging from about 100° F. to about 375° F. or higher and pressures ranging from about 14 psi to about 30,000 psi or higher. The additive of the invention comprises a hydrophobic amine and an organic acid or its corresponding ester wherein the hydrophobic amine has the following general structure:

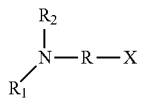

where R is a hydrophobic or partially hydrophobic group with carbon atoms ranging from about 16 to about 54, straight chained or branched, and aliphatic, cycloaliphatic or aryl aliphatic; N is a primary, secondary or tertiary amine wherein the R1 and R2 groups may be the same or different and are selected from the group consisting of a hydrogen group, alkyl group, cyano alkyl group, amino alkyl group, aryl group, amino aryl group, hydroxyl alkyl group or a derivative thereof; alternatively the R1 and R2 can be a carbonyl group, carbonate group, alkoxy group, hydroxyl group or a derivative thereof; X comprises a hydrophilic group such as an amine which can be primary, secondary or tertiary with substituents being a hydrogen group, alkyl group, cyano alkyl group, amino alkyl group, amino aryl group, hydroxyl alkyl group or a derivative thereof; alternatively the X group can be an amide group, amine oxide group, betaine group, ester group, carboxylic acid group, ether group, hydroxyl group, phosphate group, phosphonate group, pyrrolidone group, haloformyl group, nitrate group, nitrite group, sulfate group, sulfonate group, imidazoline group, pyridine group, sugar group, or a combination or derivative thereof; and wherein the organic acid is a carboxylic acid with at least one COOH group, where the solubility of the organic acid in water is at least 0.1% w/w in water at 20° C.

An example commercially available dimer diamine suitable for use in the additive of the invention is a C36 dimer diamine containing C18 fatty monoamine and C54 fatty trimer triamine which are obtained during the commercial production of the dimer diamine. Generally, quantities of such hydrophobic amine ranging from about 0.1 ppb to about 20 ppb are preferred and are effective even when the mud weight is low, that is, is in the range of about 9 to about 12 ppg. With this amine, generally quantities of 0.1 ppb to about 20 ppb of the organic acid or ester corresponding to the organic acid are used. Examples of commercially available organic acids suitable for use in the additive of the invention include lactic acid, formic acid, acrylic acid, acetic acid, chloroacetic acid, dichloroacetic acid, trichloroacetic acid, trifluoroacetic acid, propanoic acid, butyric acid, pentanoic acid, hexanoic acid, heptanoic acid, oxalic acid, malonic acid, succinic acid, glutaric acid, adipic acid, pimelic acid, suberic acid, azelaic acid, sebacic acid, maleic acid, fumaric acid, aspartic acid, citric acid, isocitric acid, aconitic acid, tartaric acid, benzoic acid, p-amino benzoic acid, phthalic acid, terephthalic acid, trimesic acid, without limitation.

The additive of the present invention is also particularly useful in formulating oil-based invert emulsion fluids with improved rheology, even when the fluids have a low mud weight. Thus, the present invention also provides improved oil-based invert emulsion drilling fluids and improved methods of drilling wellbores in subterranean formations employing such oil-based invert emulsion muds or drilling fluids, even when the muds have low mud weight. As used herein, the term "drilling" or "drilling wellbores" shall be understood in the broader sense of drilling operations, which include running casing and cementing as well as drilling, unless specifically indicated otherwise.

The invert emulsion drilling fluid of the present invention, or used in methods of the present invention, comprises an oil:water ratio preferably in the range of 50:50 to 95:5 and preferably employs a natural oil, such as for example without limitation diesel oil or mineral oil, or a synthetic base, as the oil phase, and water comprising a salt such as calcium chloride for example as the aqueous phase. The rheology additive of the invention is included for rheology stability. Clay and/or inert solids are preferably not added to provide weight or rheology control to the fluid. Invert emulsion drilling fluids of the invention may also demonstrate "fragile gel" behavior when the drilling fluid is "clay-free."

Addition of the rheology additive of the invention to the invert emulsion drilling fluid increases the Low Shear Yield Point (LSYP), Yield Point (YP), and the 10 minute Gel Strength but limits the increase in the Plastic Viscosity (PV) to about 50% or less, relative to the drilling fluid not having the additive, when measured at 120° F. At High Pressure High Temperature (HPHT) conditions, the invert emulsion drilling fluid of the present invention comprising the rheology additive of the invention has increased LSYP, YP, and 10 minute Gel Strength but similar or lower PV, relative to the drilling fluid without the rheology additive of the invention. Such a similar or lower PV seen with the invert emulsion drilling fluid of the invention is believed to help minimize the amount of density increase caused by pumping of the fluid.

DETAILED DESCRIPTION OF PREFERRED EMBODIMENTS

Figure 1:
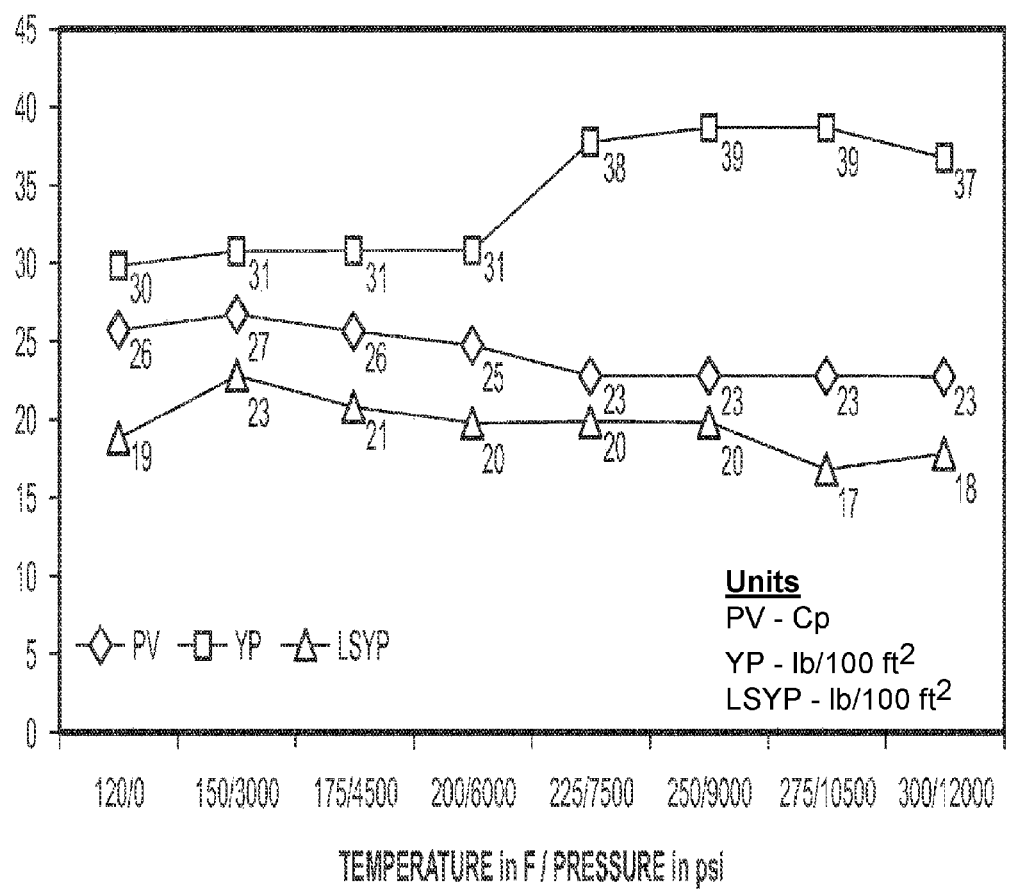
FIG. 1 is a graph comparing the plastic viscosity, yield point and low shear yield point of an example 12 ppg drilling fluid formulation of the invention comprising a dimethyl adipate-fatty dimer diamine rheology additive of the invention, under various temperature and pressure conditions.

The present invention provides a rheology additive for oil-based, invert emulsion drilling fluids which imparts to such drilling fluids comprising such additive with improved performance in the field at mud weights in the range of about 9 ppg to about 20 ppg. The present invention also provides a method of drilling employing an invert emulsion drilling fluid of the invention or an invert emulsion drilling fluid comprising the rheology additive of the invention.

The oil base of invert emulsion drilling fluids of the present invention may be a natural oil such as for example mineral oil or diesel oil, or a synthetic base such as, for example, BAROID ALKANE® base comprising available from Halliburton Energy Services, Inc., in Houston, Tex. and Duncan, Okla., and EDC 99DW base available from TOTAL. A mineral oil may be successfully used as the oil base in the present invention, even though in the prior art some difficulties have been experienced in obtaining desirable rheological properties with mineral oils under certain conditions such as low mud weights, that is, mud weights ranging from about 9 to about 12 ppg, and particularly at high temperatures (greater than 225° F.). Mineral oils particularly suitable for use in the invention are selected from the group consisting of n-paraffins, iso-paraffins, cyclic alkanes, branched alkanes, and mixtures thereof.

An aqueous solution containing a water activity lowering compound, composition or material, comprises the internal phase of the invert emulsion. Such solution is preferably a saline solution comprising calcium chloride (typically about 25% to about 30%, depending on the subterranean formation water salinity or activity), although other salts or water activity lowering materials such as for example sugar known in the art may alternatively or additionally be used. Such other salts may include for example sodium chloride, sodium bromide, calcium bromide and formate salts. Water preferably comprises less than 50%, or as much as about 50%, of the drilling fluid and the oil:water ratio preferably ranges from about 50:50 to about 95:5.

Drilling fluids of the present invention uniquely include the additive of the present invention as a rheology modifier, as will be discussed further below. Further, the drilling fluids of, or for use in, the present invention, have added to them or mixed with their invert emulsion oil base, other fluids or materials needed to comprise complete drilling fluids. Such other materials optionally may include, for example: additives to reduce or control low temperature rheology or to provide thinning, for example, additives having the trade names COLDTROL®, ATC®, and OMC2™; additives for enhancing viscosity, for example, an additive having the trade name RHEMOD L™ (modified fatty acid); additives for providing temporary increased viscosity for shipping (transport to the well site) and for use in sweeps, for example, an additive having the trade name TEMPERUS™ (modified fatty acid); additives for filtration control, for example, additives having the trade names ADAPTA® and BDF-366; an emulsifier activator, such as, for example, lime; additives for high temperature high pressure control (HTHP) and emulsion stability, for example, an additive having the trade name FACTANT™ (highly concentrated tall oil derivative); and additives for emulsification, for example, an additive having the trade name EZ MUL® NT (polyaminated fatty acid). All of the aforementioned trademarked products are available from Halliburton Energy Services, Inc. in Houston, Tex., and Duncan, Okla., U.S.A. As with all drilling fluids, the exact formulations of the fluids of the invention vary with the particular requirements of the subterranean formation.

A preferred commercially available drilling fluid system for use in the invention is the INNOVERT® drilling fluid system, having a paraffin/mineral oil base, available from Baroid, a Halliburton Company, in Houston, Tex. and Duncan, Okla. The INNOVERT® drilling fluid system typically comprises the following additives, in addition to the paraffin/mineral oil base and brine, for use as an invert emulsion drilling fluid: RHEMOD™ L modified fatty acid suspension and viscosifying agent, BDF-366™ or ADAPTA™ copolymer for HPHT filtration control, particularly for use at high temperatures, and EZ MUL® NT polyaminated fatty acid emulsifier/oil wetting agent, also particularly for use at high temperatures. Commercially available INNOVERT® drilling fluid systems also typically include TAU-MOD™ amorphous/fibrous material as a viscosifier and suspension agent. However, with the present invention, where the drilling fluid system has uniquely added thereto a hydrophobic amine and organic acid additive as a rheology modifier, TAU-MOD™ material is optional.

Invert emulsion drilling fluids of the present invention, comprising the additive of the invention, maintain acceptable and even preferred rheology measurements at low mud weights and do not experience a decreased rate of penetration (and with clay-free invert emulsion drilling fluids, also do not experience a decline in desired fragile gel strength) when in use in drilling even at high temperatures and pressures. At HPHT conditions, the invert emulsion drilling fluids of the present invention, comprising the hydrophobic amine and organic acid additive of the invention, has increased LSYP, YP, and 10 minute Gel Strength but similar PV relative to the drilling fluid without the additive of the invention. These advantages of the present invention are believed to be due to the addition of the additive of the invention to the drilling fluid. The advantages of the present invention are especially appreciated where the drilling fluid does not also contain organophilic clay or lignite.

The additive of the invention comprises a dimer diamine or fatty dimer diamine and an organic acid or an ester corresponding to the organic acid, where the organic acid is a carboxylic acid with atleast one COOH group and has a solubility of atleast 0.1% w/w in water at 20° C. Examples of commercially available organic acids suitable for use in the additive of the invention include lactic acid, formic acid, acrylic acid, acetic acid, chloroacetic acid, dichloroacetic acid, trichloroacetic acid, trifluoroacetic acid, propanoic acid, butyric acid, pentanoic acid, hexanoic acid, heptanoic acid, oxalic acid, malonic acid, succinic acid, glutaric acid, adipic acid, pimelic acid, suberic acid, azelaic acid, sebacic acid, maleic acid, fumaric acid, aspartic acid, citric acid, isocitric acid, aconitic acid, tartaric acid, benzoic acid, p-amino benzoic acid, phthalic acid, terephthalic acid, trimesic acid, without limitation Preferred commercially available fatty dimer diamines that may be used in the additive of the invention include for non-limiting example VERSAMINE® 552 hydrogenated fatty C36 dimer diamine, and VERSAMINE® 551 fatty C36 dimer diamine, both available from Cognis Corporation (functional products) of Monheim, Germany and Cincinnati, Ohio and PRIAMINE™ 1073 and PRIAMINE™ 1074 fatty C36 dimer diamine, both available from Croda Internationale Plc of Goole East Yorkshire, United Kingdom and New Castle, Del. Typically, an amount of such dimer diamine in the range of about 0.1 pound per barrel (ppb) to about 20 ppb is sufficient for purposes of the invention. These fatty dimer diamines are prepared commercially from fatty dimer diacids which have been produced from dimerisation of vegetable oleic acid or tall oil fatty acid by thermal or acid catalyzed methods.

The dimerisation of C18 tall oil fatty acids produces the material leading to the C36 dimer acids. This material is a mixture of monocyclic dicarboxylic acid, acyclic dicarboxylic acid and bicyclic dicarboxylic acid along with small quantities of trimeric triacids. These diacids are converted into diamines via the reaction scheme given below:

Reaction Scheme I

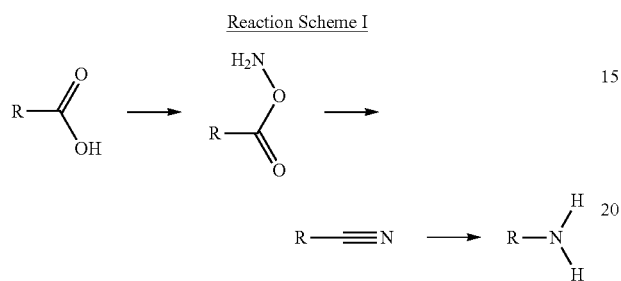

These diamines are further converted into compounds that fall under the scope of hydrophobic amine additives. These diamines are converted into cyanoethyl derivatives via cyanoethylation with acrylonitrile; these cyanoethyl derivatives are further reduced into aminopropyl amines via reduction as shown in the reaction scheme II below, as taught in U.S. Pat. No. 4,250,045, issued Feb. 10, 1981 to Coupland, et al.

Reaction Scheme II

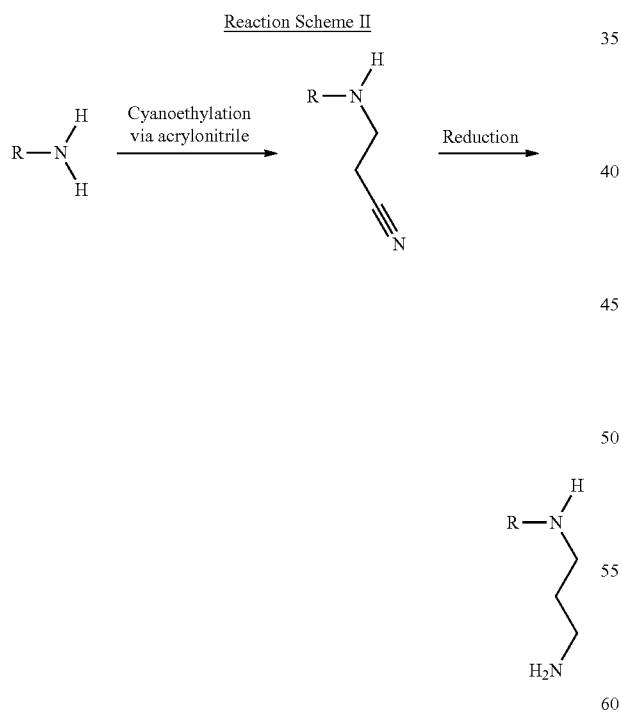

Dicyanoethylated dimer diamine is available commercially as Kemamine DC 3680 and 3695 and di N-aminopropylated dimer diamine is available commercially as Kemamine DD 3680 and 3695 from Chemtura Corporation USA. Different structures of the dimeric hydrophobic amine additives are given below:

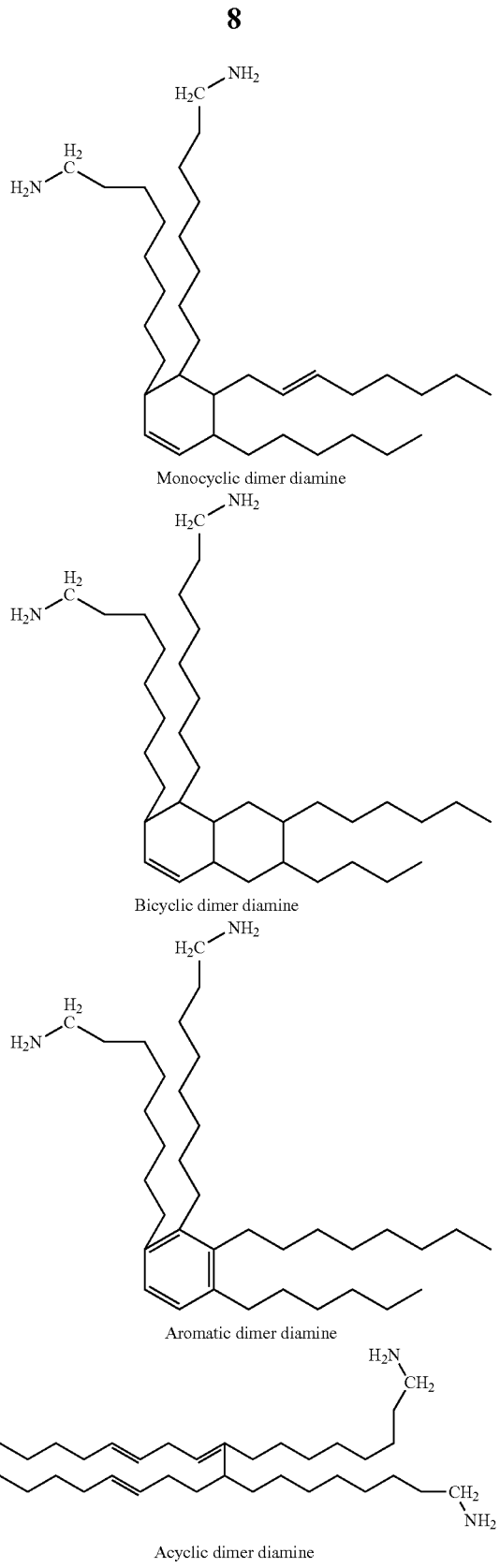

Monocyclic dimer diamine

Bicyclic dimer diamine

Aromatic dimer diamine

Acyclic dimer diamine

Laboratory tests demonstrate the effectiveness of the present invention. Referring to experiments whose results are graphed in FIG. 1, a 12 ppg INNOVERT® invert emulsion drilling fluid was prepared using paraffin/mineral oil base in a 70:30 oil to water ratio with calcium chloride brine having a water phase salinity of 250,000 parts per million (ppm). To this, additives were mixed in for a drilling fluid having the components as indicated in Table 1 below:

TABLE 1

Effect of Adipic Acid/Fatty Dimer Diamine and Dimethyl Adipate/Fatty Dimer Diamine Additives on Rheology of 12 ppg Invert Emulsion Drilling Fluids

| OWR 70:30 | Time, min | 1 (Base) | 2 | 3 | 4 |
|---|---|---|---|---|---|
| EDC 99-DW ®, ppb | | 150.6 | 147.0 | 149.7 | 148.8 |
| EZ MUL NT ®, ppb | 5 | 11 | 11 | 11 | 11 |
| Lime, ppb | 5 | 1.3 | 1.3 | 1.3 | 1.3 |
| ADAPTA ®, ppb | 5 | 2 | 2 | 2 | 2 |
| Dimethyl Adipate, ppb | 5 | — | 5 | — | — |
| Adipic acid, ppb | 5 | — | — | 2.5 | 5 |
| CaCl$_2$ soln(250K ppm), ppb | 5 | 113.7 | 113.8 | 113.1 | 112.5 |
| Revdust, ppb | 5 | 20 | 20 | 20 | 20 |
| BDF 570 ™ Fatty Dimer Diamine, ppb | 5 | 2 | 2 | 2 | 2 |
| BAROID ® Barite, ppb | 5 | 203.3 | 201.9 | 202.4 | 201.4 |
| Hot rolled at 250 F., 16 hrs | | | | | |
| 600 rpm | @120 F. | 60 | 89 | 128 | 152 |
| 300 rpm | @120 F. | 32 | 60 | 90 | 120 |
| 200 rpm | @120 F. | 24 | 49 | 74 | 108 |
| 100 rpm | @120 F. | 15 | 35 | 57 | 97 |
| 6 rpm | @120 F. | 5 | 16 | 28 | 93 |
| 3 rpm | @120 F. | 4 | 15 | 26 | 80 |
| PV | @120 F. | 28 | 29 | 38 | 32 |
| YP | @120 F. | 4 | 31 | 52 | 88 |
| LSYP | @120 F. | 3 | 14 | 24 | 67 |
| 10 sec gel | @120 F. | 6 | 21 | 30 | 82 |
| 10 min gel | @120 F. | 9 | 26 | 40 | 85 |

All trademarked products above and in other tables below are available from Halliburton Energy Services, Inc., in Houston, Tex. and Duncan, Okla., except that REV DUST is an artificial drill solid available from Milwhite Inc, in Houston Tex. These compositions set forth in Table 1 were hot rolled at 250° F. for 16 hours. The fluids were then further mixed for 5 minutes and evaluated on a FANN 35 rheometer at 120° F., testing Plastic Viscosity (PV), Yield Point (YP), yield stress (Tau zero) and Low Shear Yield Point (LSYP).

The Plastic Viscosity (PV), Yield Point (YP), Yield Stress (Tau zero) and Low Shear Yield Point (LSYP) of the invert emulsion drilling fluid were determined on a direct-indicating rheometer, a FANN 35 rheometer, powered by an electric motor. The rheometer consists of two concentric cylinders, the inner cylinder is called a bob, while the outer cylinder is called a rotor sleeve. The drilling fluid sample is placed in a thermostatically controlled cup and the temperature of the fluid is adjusted to 120 (±2° F. The drilling fluid in the thermostatically controlled cup is then placed in the annular space between the two concentric cylinders of the FANN 35. The outer cylinder or rotor sleeve is driven at a constant rotational velocity. The rotation of the rotor sleeve in the fluid produces a torque on the inner cylinder or bob. A torsion spring restrains the movement of the bob, and a dial attached to the bob indicates displacement of the bob. The dial readings are measured at different rotor sleeve speeds of 3, 6, 100, 200, 300 and 600 revolutions per minute (rpm).

Generally, Yield Point (YP) is defined as the value obtained from the Bingham-Plastic rheological model when extrapolated to a shear rate of zero. It may be calculated using 300 rpm and 600 rpm shear rate readings as noted above on a standard oilfield rheometer, such as a FANN 35 or a FANN 75 rheometer. Similarly, Yield Stress or Tau zero is the stress that must be applied to a material to make it begin to flow (or yield), and may commonly be calculated from rheometer readings measured at rates of 3, 6, 100, 200, 300 and 600 rpm. The extrapolation may be performed by applying a least-squares fit or curve fit to the Herchel-Bulkley rheological model. A more convenient means of estimating the Yield Stress is by calculating the Low-Shear Yield Point (LSYP) by the formula shown below in Equation 2 except with the 6 rpm and 3 rpm readings substituted for the 600-rpm and 300-rpm readings, respectively. Plastic Viscosity (PV) is obtained from the Bingham-Plastic rheological model and represents the viscosity of a fluid when extrapolated to infinite shear rate. The PV is obtained from the 600 rpm and the 300 rpm readings as given below in Equation 1. A low PV may indicate that a fluid is capable of being used in rapid drilling because, among other things, the fluid has low viscosity upon exiting the drill bit and has an increased flow rate. A high PV may be caused by a viscous base fluid, excess colloidal solids, or both. The PV and YP are calculated by the following set of equations:

PV=(600 rpm reading)−(300 rpm reading)        (Equation 1)

YP=(300 rpm reading)−PV        (Equation 2)

More particularly, each of these tests were conducted in accordance with standard procedures set forth in *Recommended Practice* 13B-2, *Recommended Practice for Field Testing of Oil-based Drilling Fluids*, Fourth Edition, American Petroleum Institute, Mar. 1, 2005, the contents of which is hereby incorporated herein by reference.

The results of the tests reported in Table 1 demonstrate that the base formulation of the invert emulsion drilling fluid had a Yield Point (YP) of 4 and a Low-Shear Yield Point (LSYP) of 3. However, on addition of the adipic acid (HOOC—(CH$_2$)$_4$—COOH) at 2.5 ppb concentration to the base formulation of the invert emulsion drilling fluid, the fluid's YP and LSYP improved significantly—by 1200% for the YP and 700% for the LSYP. On adding a higher concentration of adipic acid—5 ppb concentration—to the base fluid, the fluid's YP and LSYP improved even more—by 2100% for the YP and 675% for the LSYP. Addition of dimethyl adipate (H$_3$COOC—(CH$_2$)$_4$—COOCH$_3$) at 5 ppb concentration to the base formulation of the invert emulsion drilling fluid, also improved the fluid's YP and LSYP—by 675% for the YP and 370% for the LSYP. The PV increased only marginally, with the highest rise being 35% for 2.5 ppb adipic acid.

Figure 2:
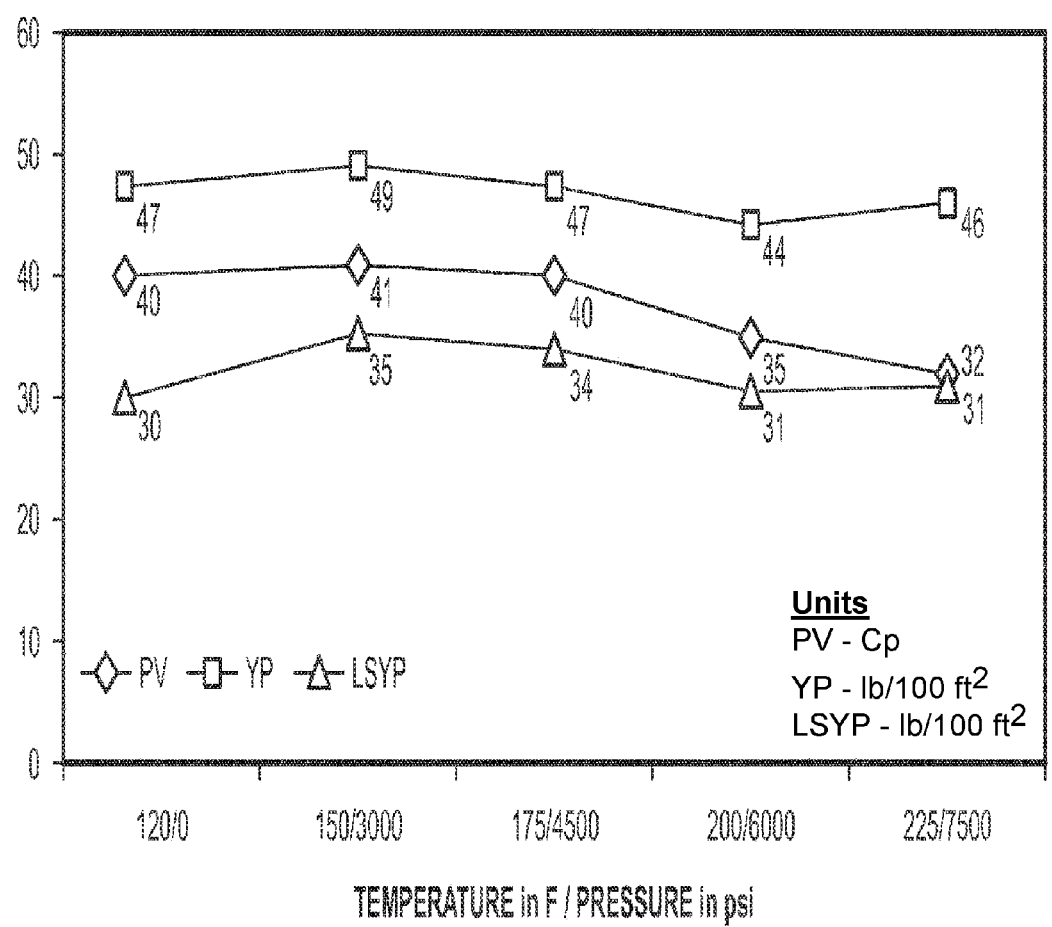
FIG. 2 is a graph comparing the plastic viscosity, yield point and low shear yield point of a different example 12 ppg drilling fluid formulation of the invention comprising an adipic acid-fatty dimer diamine rheology additive of the invention, under various temperature and pressure conditions.

Samples of formulations 2 and 3 of the invert emulsion drilling fluid set forth in Table 1, containing respectively 5 ppb dimethyl adipate and 2 ppb fatty dimer diamine (formulation 2) and 2.5 ppb adipic acid and 2 ppb fatty dimer diamine (formulation 3), were evaluated further with a FANN 75 rheometer using simulated down hole conditions, and particularly testing high temperature and high pressure rheology. The FANN 75 rheometer measures similarly as the FANN 35 rheometer but can measure rheology under high temperature and pressure. The results of these tests are set forth in Tables 2 and 3 (showing rheological data) and in FIGS. 1 and 2 (showing PV, YP and LSYP).

TABLE 2

Fann75 Rheology of 12 ppg Invert Emulsion Drilling Fluid with Dimethyl Adipate/Fatty Dimer Diamine Additive Under High Temperature and High Pressure Conditions

| RPM | 120 F. 0 psi | 150 F. 3000 psi | 175 F. 4500 psi | 200 F. 6000 psi | 225 F. 7500 psi | 250 F. 9000 psi | 275 F. 10500 psi | 300 F. 12000 psi |
|---|---|---|---|---|---|---|---|---|
| 600 | 82 | 85 | 83 | 81 | 84 | 85 | 85 | 83 |
| 300 | 56 | 58 | 57 | 56 | 61 | 62 | 62 | 60 |
| 200 | 47 | 48 | 47 | 48 | 53 | 54 | 53 | 51 |
| 100 | 36 | 37 | 37 | 38 | 43 | 43 | 42 | 40 |
| 6 | 19 | 23 | 23 | 22 | 24 | 24 | 21 | 20 |
| 3 | 19 | 23 | 22 | 21 | 22 | 22 | 19 | 19 |
| PV | 26 | 27 | 26 | 25 | 23 | 23 | 23 | 23 |
| YP | 30 | 31 | 31 | 31 | 38 | 39 | 39 | 37 |
| LSYP | 19 | 23 | 21 | 20 | 20 | 20 | 17 | 18 |

TABLE 3

Fann75 Rheology of 12 ppg Invert Emulsion Drilling Fluid with Adipic Acid/Fatty Dimer Diamine Additive Under High Temperature and High Pressure Conditions

| RPM | 120 F. 0 psi | 150 F. 3000 psi | 175 F. 4500 psi | 200 F. 6000 psi | 225 F. 7500 psi |
|---|---|---|---|---|---|
| 600 | 127 | 131 | 127 | 114 | 110 |
| 300 | 87 | 90 | 87 | 79 | 78 |
| 200 | 73 | 74 | 71 | 67 | 67 |
| 100 | 56 | 58 | 56 | 54 | 54 |
| 6 | 30 | 37 | 38 | 35 | 33 |
| 3 | 30 | 36 | 36 | 33 | 32 |
| PV | 40 | 41 | 40 | 35 | 32 |
| YP | 47 | 49 | 47 | 44 | 46 |
| LSYP | 30 | 35 | 34 | 31 | 31 |

The rheology additive of the invention was also tested in 12 ppg invert emulsion drilling fluids prepared with different mineral oil bases and in the absence of any externally added low gravity solids (LGS). The compositions and results of these tests are shown in Table 4. Again, the additive of the invention resulted in the drilling fluids showing significant improvements in YP and LSYP, with the respective rise being 2100% for YP and 4260% for LSYP for the ESCAID 110 oil based invert emulsion fluid, and 300% for YP and 510% for LSYP for the Baroid Alkane oil based invert emulsion fluid. The PV changed only marginally in comparison to the YP and the LSYP for these mineral oils.

TABLE 4

Performance of Adipic Acid/Fatty Dimer Diamine and Dimethyl Adipate/Fatty Dimer Diamine Additives in 12 ppg Invert Emulsion Drilling Fluids Having Different Mineral Oil Bases

| OWR 70:30 | Time, min | 1 (BASE) | 2 | 3 (BASE) | 4 | 5 (BASE) | 6 |
|---|---|---|---|---|---|---|---|
| EDC 99-DW ®, ppb | | 150.6 | 148.8 | — | — | — | — |
| Escaid 110, ppb | | — | — | 146.29 | 144.54 | — | — |
| Baroid Alkane, ppb | | — | — | — | — | 144.16 | 143.29 |
| EZ MUL NT ®, ppb | 2 | 11 | 11 | 11 | 11 | 11 | 11 |
| Lime, ppb | 5 | 1.3 | 1.3 | 1.3 | 1.3 | 1.3 | 1.3 |
| ADAPTA ®, ppb | 5 | 2 | 2 | 2 | 2 | 2 | 2 |
| Adipic acid, ppb | 5 | — | 5 | — | 5 | — | 2.5 |
| CaCl$_2$ soln(250K ppm), ppb | 5 | 113.7 | 112.5 | 113.27 | 112.01 | 113.06 | 112.43 |
| Revdust, ppb | 5 | 20 | 20 | 20 | 20 | 20 | 20 |
| BAROID ®, ppb | 5 | 203.3 | 201.4 | 208.1 | 206.1 | 210.5 | 209.5 |
| Fatty Dimer Diamine, ppb | 5 | 2 | 2 | 2 | 2 | 2 | 2 |
| Hot rolled at 250 F., 16 hrs | | | | | | | |
| 600 rpm | @120 F. | 60 | 152 | 45 | 161 | 55 | 132 |
| 300 rpm | @120 F. | 32 | 120 | 25 | 137 | 37 | 103 |
| 200 rpm | @120 F. | 24 | 108 | 17 | 125 | 30 | 87 |
| 100 rpm | @120 F. | 15 | 97 | 11 | 114 | 21 | 73 |
| 6 rpm | @120 F. | 5 | 93 | 3 | 104 | 8 | 45 |
| 3 rpm | @120 F. | 4 | 80 | 3 | 102 | 7 | 41 |
| PV | @120 F. | 28 | 32 | 20 | 24 | 18 | 29 |
| YP | @120 F. | 4 | 88 | 5 | 113 | 19 | 74 |
| LSYP | @120 F. | 3 | 67 | 3 | 101 | 6 | 37 |
| 10 sec gel | @120 F. | 6 | 82 | 3 | 101 | 7 | 40 |
| 10 min gel | @120 F. | 9 | 85 | 6 | 106 | 10 | 46 |

The rheology additive of the present invention has the further advantage of being biodegradable with low ecotoxicity. Specifically, testing in a bioassay lab at Houston, Tex. indicated that fatty dimer diamines are biodegradable (66.5% and 82.1% in 28 days and 35 days respectively, marine BODIS method) and have low ecotoxicity (48-hr LC50 of >10 g/L, 96-hr LC50 of >10 g/L and a 96-hr NOEC of 10 g/L to the marine juvenile fish *Cyprinodont variegates;* 24-hr LC50, 48-hr LC50, 48-hr LC90 of >10 g/L and a 48-hr NOEC of 10 g/L for marine copepod Acartia Tonsa, a 10 day LC50 value of greater than 12469.47 mg·kg-1 (via dried sediment) to the marine amphipod Corophium volutator in the sediment phase). The test methods for *Cyprinodon variegatus* fish were consistent with OECD 203 guideline for marine testing of offshore chemicals. The test methods for copepods Acartia Tonsa were consistent with ISO 14669: 1999(E) guideline for marine testing of offshore chemicals while the test methods for algae Skeletonema costatum were consistent with ISO 10253:2006, OECD guideline as adapted for marine testing of offshore chemicals. Also, dimethyl adipate is reported as readily biodegradable (see http://www.dow.com/custproc/products/dma.htm) and adipic acid is reported as readily biodegradable (see http://fscimage.fishersci.com/msds/00390.htm). An 84% conversion of adipic acid's carbon content to carbon dioxide was observed after 30 days aerobic incubation in soil biometer flasks at an initial adipic acid concentration of 1 mg/g soil. Also, an estimated BCF value of 0.68 for adipic acid, from a measured log Kow, suggests that bioconcentration in aquatic organisms is low. Eco-toxicity study of adipic acid shows a LC50 value of 97-330 mg/L (24-96 Hr.; Static conditions, 18-22° C.) for Bluegill/Sunfish. In the case of dimethyl adipate too, the bioconcentration potential is low (BCF<100 or Log Pow<3). An eco-toxicity study of Dimethyl Adipate indicated a LC50 value of 72 mg/l and EC50 value of >100 mg/lit for water flea *Daphnia magna*, (static, 48 hr.) and green alga Selenastrum capricornutum (Growth rate inhibition, 72 h) respectively. Due to the high biodegradability, low bioaccumulation potential and low ecotoxicity, the additives dimethyl adipate and adipic acid are believed likely to pass even stringent North Sea regulations.

The advantages of the methods of the invention may be obtained by employing a drilling fluid of the invention in drilling operations. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures. The fluids of the invention afford real-time monitoring and rapid adjustment of the fluid to accommodate changes in such subterranean formation conditions. Further, the fluids of the invention may be recycled during a drilling operation such that fluids circulated in a wellbore may be recirculated in the wellbore after returning to the surface for removal of drill cuttings for example. The drilling fluid of the invention may even be selected for use in a drilling operation to reduce loss of drilling mud during the drilling operation and/or to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:

1. A method comprising contacting at least a portion of a subterranean formation with an invert emulsion fluid comprising a rheology modifier comprising a fatty dimer diamine having 28 to 48 carbon atoms per molecule and an acid or an acid derivative, wherein the acid is adipic acid and the fatty dimer diamine has the following chemical structure:

2. The method of claim 1, wherein the invert emulsion fluid has a yield point greater than about 50 lb/100 ft$^2$.

3. The method of claim 1, wherein the invert emulsion fluid is formulated without the addition of organophilic clays or lignites, and organophilic clays and lignites are not added to the fluid during use.

4. The method of claim 1, wherein the adipic acid is present in a concentration of between about 0.25 ppb to about 10 ppb and the fatty dimer diamine is present in a concentration of between about 0.25 ppb to about 18 ppb.

5. The method of claim 4, wherein the adipic acid is present in a concentration of between about 4 ppb to about 6 ppb and the fatty dimer diamine present in a concentration of between about 1 ppb to about 3 ppb.

6. The method of claim 1, wherein the 10 second gel strength at 120° F. is greater than about 50 lb/100 ft$^2$.

7. The method of claim 1, wherein the invert emulsion fluid has a yield point greater than about 30 lb/100 ft$^2$.

8. The method of claim 1, the method further comprising contacting at least a portion of an annulus of a wellbore with the invert emersion fluid.

9. The method of claim 8, wherein the invert emulsion fluid has a yield point greater than about 30 lb/100 ft$^2$.

10. An invert emulsion fluid comprising a rheology modifier comprising a fatty dimer diamine having 28 to 48 carbon atoms per molecule and an acid or an acid derivative, wherein the acid is adipic acid and the fatty dimer diamine has the following chemical structure:

11. The invert emulsion fluid of claim 10, wherein the invert emulsion fluid is formulated without the addition of organophilic clays or lignites and organophilic clays and lignites are not added to the fluid during use.

12. The invert emulsion fluid of claim 10, wherein the adipic acid is present in a concentration of between about 0.25 ppb to about 10 ppb and the fatty dimer diamine is present in a concentration of between about 0.25 ppb to about 18 ppb.

13. The invert emulsion fluid of claim 10, wherein the 10 second gel strength at 120° F. is greater than about 50 lb/100 ft$^2$.

14. A method of treating an annulus of a wellbore, the method comprising contacting at least a portion of the annulus with an invert emulsion fluid comprising a rheology modifier comprising a fatty dimer diamine having 28 to 48 carbon atoms per molecule and an acid or an acid derivative, wherein the acid is adipic acid and the fatty dimer diamine has the following chemical structure:
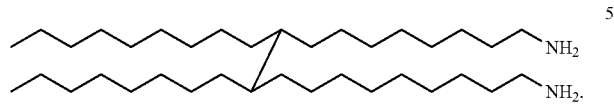
15. The method of claim 14, wherein the adipic acid is present in a concentration of between about 0.25 ppb to about 10 ppb and the fatty dimer diamine is present in a concentration of between about 0.25 ppb to about 18 ppb.
* * * * *